United States Patent
Izumi et al.

(10) Patent No.: US 10,369,665 B2
(45) Date of Patent: Aug. 6, 2019

(54) BRAZED STRUCTURE

(71) Applicants: KOBE STEEL, LTD., Kobe-shi (JP); DENSO CORPORATION, Kariya-shi (JP)

(72) Inventors: Takahiro Izumi, Tochigi (JP); Shimpei Kimura, Tochigi (JP); Yuji Shibuya, Tochigi (JP); Shoei Teshima, Aichi (JP); Hayaki Teramoto, Aichi (JP); Osamu Hakamata, Aichi (JP)

(73) Assignees: KOBE STEEL, LTD., Kobe-shi (JP); DENSO CORPORATION, Kariya-shi (JP)

( * ) Notice: Subject to any disclaimer, the term of this patent is extended or adjusted under 35 U.S.C. 154(b) by 751 days.

(21) Appl. No.: 14/777,137

(22) PCT Filed: Mar. 24, 2014

(86) PCT No.: PCT/JP2014/058138
§ 371 (c)(1),
(2) Date: Sep. 15, 2015

(87) PCT Pub. No.: WO2014/157116
PCT Pub. Date: Oct. 2, 2014

(65) Prior Publication Data
US 2016/0031045 A1    Feb. 4, 2016

(30) Foreign Application Priority Data

Mar. 29, 2013 (JP) .................................. 2013-075264

(51) Int. Cl.
*B23K 35/22* (2006.01)
*B23K 35/02* (2006.01)
(Continued)

(52) U.S. Cl.
CPC ........ *B23K 35/0233* (2013.01); *B23K 35/286* (2013.01); *B32B 15/016* (2013.01);
(Continued)

(58) Field of Classification Search
None
See application file for complete search history.

(56) References Cited

U.S. PATENT DOCUMENTS 4,761,267 A * 8/1988 Takeno ................ B32B 15/016
148/438
5,292,595 A    3/1994 Yamauchi et al.
(Continued)

FOREIGN PATENT DOCUMENTS

DE    10 2008 034 031 A1    2/2009
JP         S63123561    *    5/1988
(Continued)

OTHER PUBLICATIONS

International Search Report and Written Opinion dated May 27, 2014 in PCT Application No. PCT/JP2014/058138 (with English Translation).
(Continued)

*Primary Examiner* — Daniel J. Schleis
(74) *Attorney, Agent, or Firm* — Oblon, McClelland, Maier & Neustadt, L.L.P.

(57) ABSTRACT

This brazed structure includes a brazing sheet that has been brazed and that comprises: a core material comprising an aluminum alloy which contains 0.3-1.0 mass %, excluding 0.3 mass %, Si, 0.6-2.0 mass %, excluding 0.6 mass %, Mn, 0.3-1.0 mass %, excluding 0.3 mass %, Cu, and 0.15-0.5 mass %, excluding 0.15 mass %, Mg, with the remainder comprising Al and unavoidable impurities, and has an average crystal grain diameter of 50 μm or larger and in which an Mg—Si intermetallic compound and an Al—Mg—Si—
(Continued)

Cu intermetallic compound account for 40% or less of the grain boundaries; and, clad to the core material, a brazing material comprising an Al—Si alloy.

11 Claims, 3 Drawing Sheets

(51) Int. Cl.
    *C22C 21/00*     (2006.01)
    *C22F 1/04*     (2006.01)
    *B23K 35/28*     (2006.01)
    *B32B 15/01*     (2006.01)

(52) U.S. Cl.
    CPC ............... *C22C 21/00* (2013.01); *C22F 1/04* (2013.01); *Y10T 428/12764* (2015.01)

(56) References Cited

U.S. PATENT DOCUMENTS

| | | | |
|---|---|---|---|
| 6,413,331 B1 * | 7/2002 | Hurd | C22C 21/00 148/528 |
| 8,043,711 B2 * | 10/2011 | Koshigoe | B32B 15/016 228/262.5 |
| 2009/0020585 A1 | 1/2009 | Fukumoto et al. | |
| 2011/0287276 A1 | 11/2011 | Izumi et al. | |

FOREIGN PATENT DOCUMENTS

| | | | |
|---|---|---|---|
| JP | 64-83396 | A | 3/1989 |
| JP | 1-91962 | A | 4/1989 |
| JP | 3-8569 | A | 1/1991 |
| JP | 4-193925 | A | 7/1992 |
| JP | 4-263033 | A | 9/1992 |
| JP | 5-230575 | A | 9/1993 |
| JP | 2002-283047 | A | 10/2002 |
| JP | 2002283047 | * | 10/2002 |
| JP | 2009-22981 | A | 2/2009 |
| JP | 2011-241434 | A | 12/2011 |
| JP | 2011-241435 | A | 12/2011 |
| JP | 2012-97320 | A | 5/2012 |

OTHER PUBLICATIONS

Kornfeinung, "Grain boundary strengthening", In: Wikipedia, The Free Encyclopedia. URL: https://de.wikipedia.org/w/index.php?title=Kornfeinung&oldid=111836730, version of Dec. 18, 2012 [retrieved on Oct. 10, 2017], (with English Translation).

Kammer, C., Aluminium-Taschenbuch ("Aluminum manual"). 1 Grundlagen und Werkstoffe. 16th ed., Dusseldorf: Aluminium-Verlag, 2002. p. 437 and 451.—ISBN 3-87017-274-6, (with English Translation).

* cited by examiner

BRAZED STRUCTURE

TECHNICAL FIELD

The present invention relates to a brazed joint structure suitably used for automotive heat exchangers and the like.

BACKGROUND ART

A brazing sheet containing an aluminum alloy (hereinafter sometimes simply referred to as an "Al alloy") having a brazing filler material and a sacrificial material provided on one surface or both surfaces of a core material (such a brazing sheet is hereinafter sometimes simply referred to as a "brazing sheet") is conventionally used as a material for heat exchangers of automobiles and the like.

In recent years, weight reduction of automotive heat exchangers is strongly demanded, and further thickness reduction is required in a brazing sheet. It is necessary for the thickness reduction to increase tensile strength of a brazing sheet after brazing. For this reason, an aluminum alloy having excellent tensile strength, such as an Al—Si—Cu—Mn alloy and an alloy having Mg further added thereto, are developed as a core material of a brazing sheet.

For example, Patent Literature 1 discloses a brazing sheet having excellent tensile strength after brazing, using an Al—Si—Fe—Cu—Mn—Mg alloy as a core material of a brazing sheet.

PRIOR ART LITERATURES

Patent Literature

Patent Literature 1: Japanese Unexamined Patent Application Publication (JP-A) No. 2009-22981

SUMMARY OF THE INVENTION

Problems to be Solved by the Invention

Generally, tensile strength after brazing and corrosion resistance are required as a material for heat exchangers of automobiles and the like. For this reason, in the demand of thickness reduction, further performance improvement is desired in not only tensile strength after brazing, but corrosion resistance. The brazing sheet disclosed in Patent Literature 1 has excellent tensile strength after brazing, but it does not always say that corrosion resistance is sufficient.

The present invention has been made in view of the above situations, and has an object to provide a brazed joint structure having excellent tensile strength after brazing and corrosion resistance, while maintaining brazability and formability.

Means for Solving the Problems

In view of the fact that an Al—Si—Cu—Mn—Mg alloy having high strength exists as an aluminum alloy having excellent tensile strength after brazing, the present inventors have advanced investigations, on the assumption that the alloy is used as a material for a core material of the brazing sheet, on the relationship between microcrystal structure of a core material constituting a brazing sheet after brazing and corrosion resistance.

As a result, they have found that when an average grain size of a core material is less than 50 μm, a volume fraction of a grain boundary is increased and corrosion resistance is deteriorated. They have further found that in a core material of a brazing sheet using an Al—Si—Cu—Mn—Mg aluminum alloy, Mg—Si and Al—Mg—Si—Cu intermetallic compounds preferentially precipitate in a grain boundary during cooling after brazing heating, and a depleted zone of solid solution element of Si and Cu is formed in the vicinity of a grain boundary. They have further found that the depleted zone has potential less noble than that of the inside of the grain and is therefore likely to be preferentially corroded, and as a result, grain boundary corrosion susceptibility of the depleted zone is increased and corrosion resistance is deteriorated.

It was considered that the formation of the depleted zone of solid solution element of Si and Cu in the vicinity of the grain boundary is due to that Mg—Si and Al—Mg—Si—Cu intermetallic compounds precipitate in the grain boundary. Therefore, to attempt the improvement of corrosion resistance, it was presumed that suppressing the precipitation of such intermetallic compounds is an important point.

As a result of investigations on the relationship between the degree of precipitation of Mg—Si and Al—Mg—Si—Cu intermetallic compounds and corrosion resistance in view of the above, they have found that those have good relationship. They have further found that to appropriately suppress the precipitation of Mg—Si and Al—Mg—Si—Cu intermetallic compounds, it is most effective to control a cooling rate after brazing heating among various production conditions to a specific rate or more, and have reached the present invention.

That is, the present invention has succeeded in developing a brazed joint structure constituted of a brazing sheet using an Al—Si—Cu—Mn—Mg aluminum alloy as a core material, which is a brazed joint structure having not only excellent tensile strength after brazing but excellent corrosion resistance thereafter, by controlling an average grain size of a core material to a prescribed numerical value or more and controlling the occupancy of an Mg—Si intermetallic compound and an Al—Mg—Si—Cu intermetallic compound that are present in a grain boundary of the core material to a prescribed numerical value or less.

To solve the above problems, the brazed joint structure of the present invention is a brazed joint structure comprising a brazing sheet which has been brazed, the brazing sheet comprising a core material comprising an aluminum alloy, and a brazing filler material comprising an Al—Si alloy, the brazing filler material being clad to at least one surface of the core material, in which the aluminum alloy constituting the core material contains Si in an amount of more than 0.3 mass % and 1.0 mass % or less, Mn in an amount of more than 0.6 mass % and 2.0 mass % or less, Cu in an amount of more than 0.3 mass % and 1.0 mass % or less, and Mg in an amount of more than 0.15 mass % and 0.5 mass % or less, with a remainder being Al and unavoidable impurities, in which the core material has an average grain size of 50 μm or more, and in which an occupancy of an Mg—Si intermetallic compound and an Al—Mg—Si—Cu intermetallic compound that are present in a grain boundary of the core material is 40% or less.

Thus, it is possible to improve tensile strength and corrosion resistance of a brazed joint structure which has been brazed, by using an aluminum alloy having a specific composition as a core material of the brazing sheet, controlling the average grain size of the core material to a prescribed numerical value or more, and controlling the occupancy of intermetallic compounds to 40% or less.

In the brazed joint structure of the present invention, the aluminum alloy constituting the core material preferably contains Fe in an amount of less than 0.15 mass %.

In the brazed joint structure of the present invention, the aluminum alloy constituting the core material preferably further contains Ti in an amount of more than 0.05 mass % and 0.25 mass % or less.

According to such the constitution, corrosion resistance can be further improved.

The brazed joint structure of the present invention preferably contains a sacrificial anode material which is clad to a surface of the core material opposite to the brazing filler material. According to such the constitution, the structure has excellent corrosion resistance as a material for heat exchangers of automobiles and the like.

Advantageous Effects of the Invention

The brazed joint structure of the present invention is a one which has excellent tensile strength after brazing and corrosion resistance, while maintaining brazability and formability.

MODE FOR CARRYING OUT THE INVENTION

Embodiments for carrying out the brazed joint structure of the present invention are described in detail below. An aluminum alloy constituting the core material of the present invention is first described.

(Core Material)

The aluminum alloy constituting the core material of the present invention contains Si in an amount of more than 0.3 mass % and 1.0 mass % or less, Mn in an amount of more than 0.6 mass % and 2.0 mass % or less, Cu in an amount of more than 0.3 mass % and 1.0 mass % or less, and Mg in an amount of more than 0.15 mass % and 0.5 mass % or less, with a remainder being Al and unavoidable impurities. The aluminum alloy constituting the core material of the present invention preferably contains Fe in an amount of less than 0.15 mass % and preferably further contains Ti in an amount of more than 0.05 mass % and 0.25 mass % or less.

Each element constituting the aluminum alloy constituting the core material of the present invention is described below.

(Si in Core Material: More than 0.3 Mass % and 1.0 Mass % or Less)

Si forms $Mg_2Si$, in the case where it is present together with Mg, and has the effect of thereby improving tensile strength of the aluminum alloy after brazing. This effect is small in an amount of 0.3 mass % or less. On the other hand, where the amount exceeds 1.0 mass %, a solidus temperature of a core material is decreased, and as a result, there is concern that the core material melts during brazing. Therefore, the lower limit of the content of Si is 0.3 mass % or more, and preferably 0.5 mass % or more. The upper limit is 1.0 mass % or less, and preferably 0.8 mass % or less.

(Mn in Core Material: More than 0.6 Mass % and 2.0 Mass % or Less)

Mn forms an Al—Mn—Si intermetallic compound, and has the effect of thereby improving tensile strength of the aluminum alloy after brazing. Where the amount is 0.6 mass % or less, the improvement effect of tensile strength of the aluminum alloy is insufficient. On the other hand, where the amount exceeds 2.0 mass %, the amount of a coarse intermetallic compound formed during casting is increased, and there is concern that formability is deteriorated. Therefore, the lower limit of the content of Mn is 0.6 mass % or more, and preferably 0.7 mass % or more. The upper limit is 2.0 mass % or less, and preferably 1.7 mass % or less.

(Cu in Core Material: More than 0.3 Mass % and 1.0 Mass % or Less)

Cu dissolves in solid, and has the effect of improving tensile strength. Where the amount is 0.3 mass % or less, the improvement effect of tensile strength of the aluminum alloy is insufficient. On the other hand, where the amount exceeds 1.0 mass %, a solidus temperature of the core material is decreased, and as a result, there is concern that the core material melts during brazing. Therefore, the lower limit of the content of Cu is 0.3 mass % or more, and preferably 0.5 mass % or more. The upper limit is 1.0 mass % or less, and preferably 0.9 mass % or less.

(Mg in Core Material: More than 0.15 Mass % and 0.5 Mass % or Less)

Mg forms $Mg_2Si$, in the case where it is present together with Si, and thereby improves tensile strength of the aluminum alloy after brazing. This effect is small in an amount of 0.15 mass % or less. On the other hand, where the amount exceeds 0.5 mass %, the Mg amount dissolved in flux during brazing heating is increased to deteriorate the function of the flux. Therefore, there is concern that brazability is deteriorated. Therefore, the lower limit of the content of Mg is more than 0.15 mass %. The upper limit is 0.5 mass % or less, and preferably 0.3 mass % or less.

(Fe in Core Material: Less than 0.15 Mass %)

Fe forms a coarse compound such as Al—Fe compound, Al—Fe—Si compound or Al(Fe,Mn)—Si compound during casting. Where the content is 0.15 mass % or more, the amount of the coarse compound such as Al—Fe compound, Al—Fe—Si compound or Al(Fe,Mn)—Si compound is increased, an average grain size of the core material after brazing heating is decreased, and grain boundary corrosion is likely to occur. Therefore, it is preferred that the content of Fe is limited to less than 0.15 mass %.

(Ti in Core Material: More than 0.05 Mass % and 0.25 Mass % or Less)

Ti forms a Ti—Al compound in an Al alloy and it exists in a laminar distribution. The Ti—Al compound has a noble potential. Therefore, there is the effect that corrosion form becomes a layered form and corrosion (pitting) becomes difficult to develop in a thickness direction. Where the amount is 0.05 mass % or less, layering effect of the corrosion form is small, and where the amount exceeds 0.25 mass %, there is concern that formability is deteriorated by the formation of a coarse intermetallic compound. For this reason, when Ti is added, the content of Ti is more than 0.05 mass % and 0.25 mass % or less.

(Remainder being Al and Unavoidable Impurities)

Elements other than Si, Mn, Cu, Mg and Al are Fe and Ti described above and unavoidable impurities. As the unavoidable impurities, elements such as Zn, C, Ni, Na, Ca and V are supposed. It is preferred that, such that each of those elements does not impair the characteristic of the present invention, the content of the individual element is less than 0.3 mass % and the total content of those elements is 1.0 mass % or less.

(Average Grain Size of Core Material)

It is necessary that the average grain size is 50 μm or more in the core material after brazing heating, that is, in the core material of the brazed joint structure having a brazing sheet brazed thereto. Where the average grain size is less than 50 μm, the volume fraction of the grain boundary is increased, and grain boundary corrosion is likely to occur. The preferred average grain size is 100 μm or more.

In the core material after brazing heating, that is, in the core material of the brazed joint structure having the brazing sheet brazed thereto, to achieve the average grain size of 50 μm or more, it is necessary that a coiling temperature after hot rolling (a temperature just after having been wound on a coil after completion of hot rolling) in producing the brazing sheet is set to be a temperature exceeding 250° C. Where it is 250° C. or lower, strain excessively accumulates in the core material after hot rolling, thereby austenitic grains of the core material after brazing heating are refined, and grain boundary corrosion is likely to occur. The coiling temperature after hot rolling can be measured by contacting a contact thermometer with the edge face of the coil just after winding.

(Occupancy of Intermetallic Compound Present in Grain Boundary of Core Material)

In the core material after brazing heating, that is, in the core material of the brazed joint structure having the brazing sheet brazed thereto, it is necessary that the occupancy of the Mg—Si intermetallic compound and Al—Mg—Si—Cu intermetallic compound that are present in the grain boundary is 40% or less.

When the Mg—Si intermetallic compound and Al—Mg—Si—Cu intermetallic compound precipitate in the grain boundary during cooling after brazing heating, a depleted zone of solid solution element of Si and Cu is formed in the vicinity of the grain boundary. The potential of this depleted zone is less noble than that in the grain, and becomes easy to be preferentially corroded. For this reason, where the occupancy of the intermetallic compounds exceeds 40%, the depleted zone of solid solution element of Si and Cu is increased, and a grain boundary corrosion form is likely to be formed, and corrosion resistance is deteriorated.

To achieve the occupancy of the Mg—Si intermetallic compound and Al—Mg—Si—Cu intermetallic compound that are present in the grain boundary of 40% or less in the core material after brazing heating, it is effective that a cooling rate of from a range of from 580 to 630° C., which is a general brazing heating holding temperature, to 100° C. is set to be 130° C./min or more. Where the cooling rate is less than 130° C./min, the Mg—Si intermetallic compound and Al—Mg—Si—Cu intermetallic compound are likely to precipitate and grow in the grain boundary during cooling, resulting in the increase of the occupancy of the intermetallic compounds. The preferred cooling rate is more than 200° C./min.

The occupancy of the Mg—Si intermetallic compound and Al—Mg—Si—Cu intermetallic compound that are present in the grain boundary of the core material is measured by the following method.

A brazing sheet including a core material containing an aluminum alloy, and a brazing filler material containing an Al—Si alloy, clad to at least one surface of the core material is heat-treated under the conditions of 600° C. for 3 minutes. After cooling in a prescribed cooling rate, sheet surfaces are polished up to a central portion of the core material from both sides in a thickness direction, and are observed with a transmission electron microscope (TEM). The thickness of the observation portion is measured from thickness fringes, and the place observed is set to be only a place having a thickness of from 0.1 to 0.3 μm. The vicinity of grain boundary of each sample is observed in every 10 visual fields in a magnification of 10,000, TEM photographs in the respective visual fields are subjected to image analysis, and an average value of occupancies of the intermetallic compounds obtained from 10 visual fields is indicated as the occupancy of the intermetallic compounds.

Specific calculation method of the occupancy of the intermetallic compounds is described below.

Figure 2A:
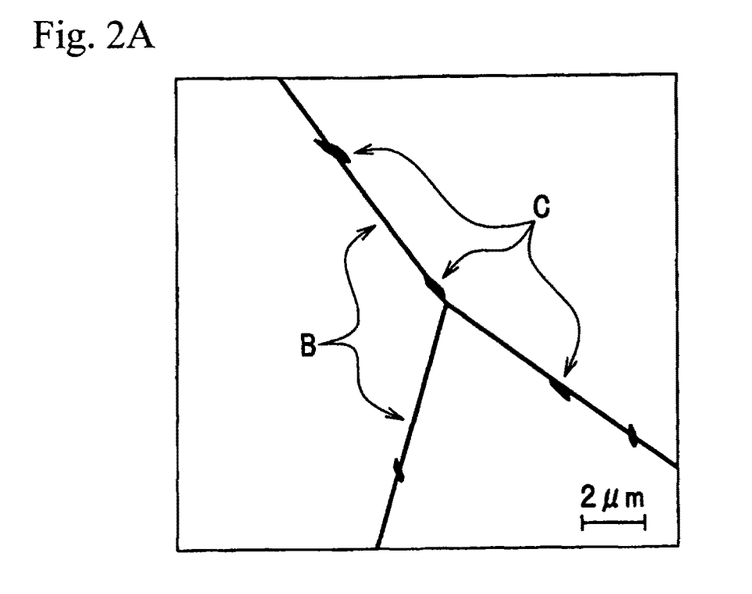
FIG. 2A is a schematic view of a TEM photograph indicating a distribution state of an Mg—Si intermetallic compound and an Al—Mg—Si—Cu intermetallic compound that are present in the grain boundary of a core material after brazing, and is a schematic view of a TEM photograph of the case where a brazing sheet was heat-treated and then cooled in a cooling rate of 250° C./min.
Figure 2B:
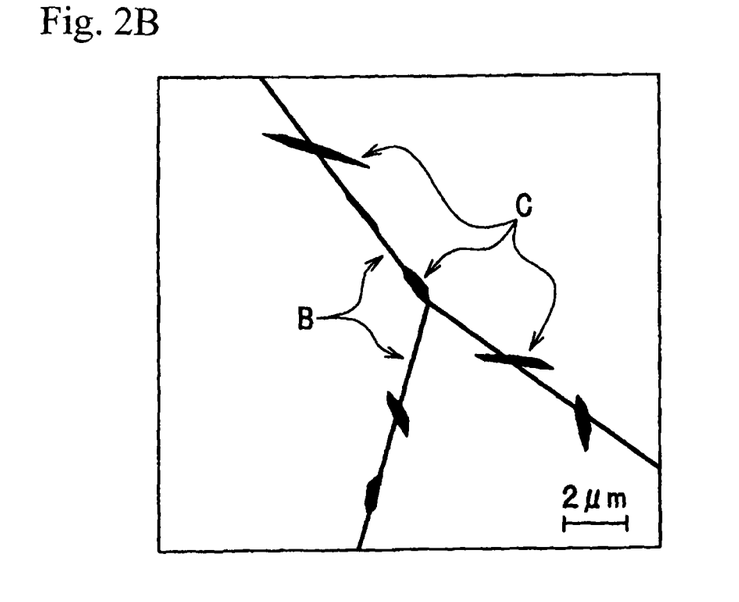
FIG. 2B is a schematic view of a TEM photograph indicating a distribution state of an Mg—Si intermetallic compound and an Al—Mg—Si—Cu intermetallic compound that are present in the grain boundary of a core material after brazing, and is a schematic view of a TEM photograph of the case where a brazing sheet was heat-treated and then cooled in a cooling rate of 100° C./min.

FIG. 2A and FIG. 2B are both schematic views of TEM photographs indicating a distribution state of the Mg—Si intermetallic compound and Al—Mg—Si—Cu intermetallic compound that are present in the grain boundary of the core material after brazing. FIG. 2A is a schematic view of a TEM photograph of the case where a brazing sheet was heat-treated and then cooled in a cooling rate of 250° C./min, and FIG. 2B is a schematic view of a TEM photograph of the case where a brazing sheet was heat-treated and then cooled in a cooling rate of 100° C./min.

A grain boundary B of grains of an alloy and an intermetallic compound C present in the vicinity of the grain boundary are illustrated in each of the schematic views. The intermetallic compound C to be measured in measuring the occupancy of the intermetallic compounds is the intermetallic compound C present on the grain boundary B, and is the intermetallic compound C in contact with the grain boundary B, even just a little.

Figure 3A:
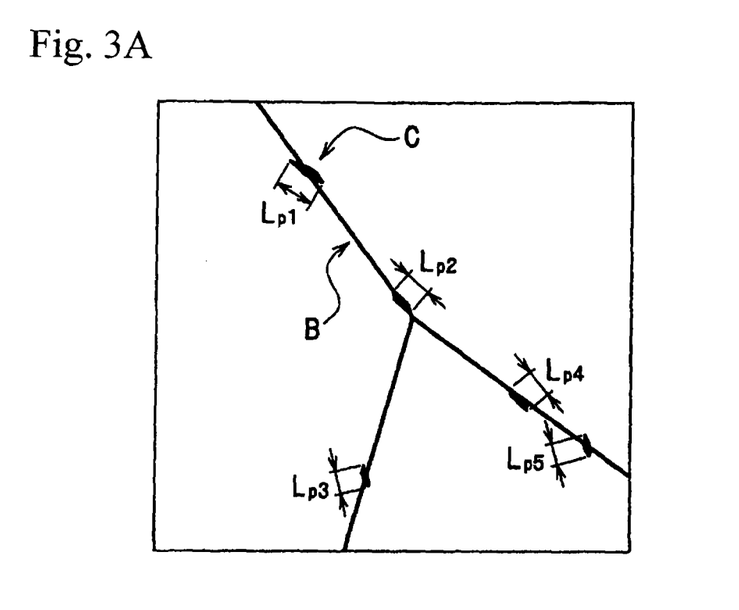
FIG. 3A is a schematic view of a TEM photograph indicating one example of a measurement method of the occupancy of an Mg—Si intermetallic compound and an Al—Mg—Si—Cu intermetallic compound that are present in the grain boundary of a core material after brazing, and is a schematic view of a TEM photograph of the case where a brazing sheet was heat-treated and then cooled in a cooling rate of 250° C./min.
Figure 3B:
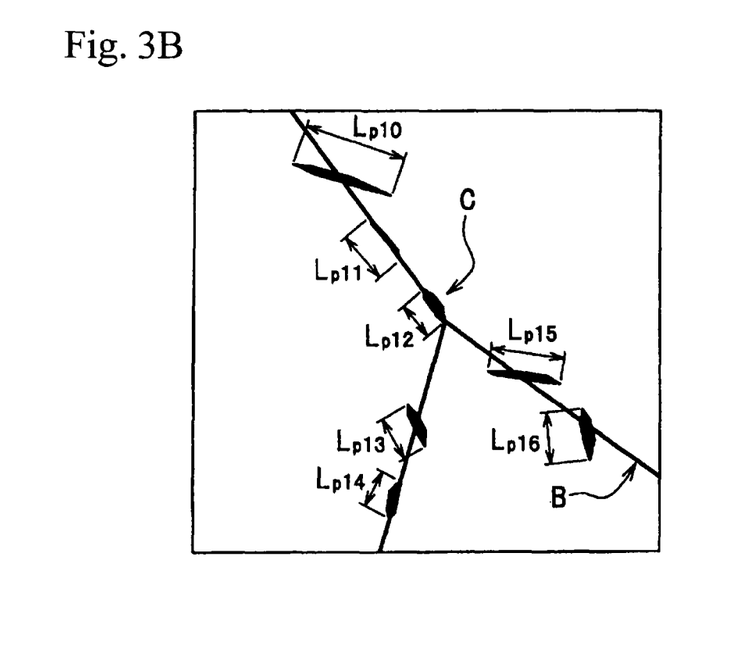
FIG. 3B is a schematic view of a TEM photograph indicating one example of a measurement method of the occupancy of an Mg—Si intermetallic compound and an Al—Mg—Si—Cu intermetallic compound that are present in the grain boundary of a core material after brazing, and is a schematic view of a TEM photograph of the case where a brazing sheet was heat-treated and then cooled in a cooling rate of 100° C./min.
Figure 3C:
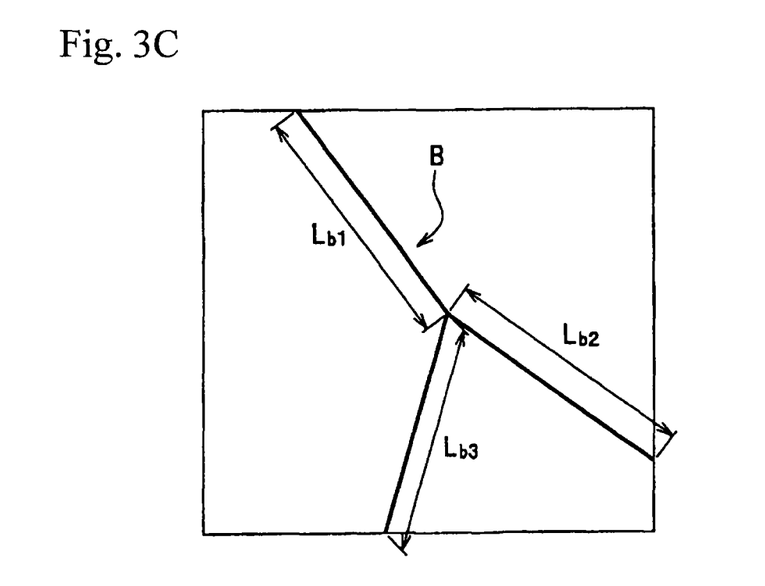
FIG. 3C corresponds to FIG. 3A and FIG. 3B, and is a schematic view illustrating only grain boundary B.

FIG. 3A, FIG. 3B and FIG. 3C each are a schematic view of a TEM photograph for explaining a measurement method of the occupancy of an Mg—Si intermetallic compound and an Al—Mg—Si—Cu intermetallic compound that are present in the grain boundary of the core material after brazing.

FIG. 3A and FIG. 3B correspond to FIG. 2A and FIG. 2B, respectively. FIG. 3A is a schematic view of a TEM photograph of the case where a brazing sheet was heat-treated and then cooled in a cooling rate of 250° C./min, and FIG.

3B is a schematic view of a TEM photograph of the case where a brazing sheet was heat-treated and then cooled in a cooling rate of 100° C./min.

FIG. 3C corresponds to FIG. 3A and FIG. 3B, and is a schematic view illustrating only the grain boundary B.

As illustrated in FIG. 3C, the respective lengths $L_{b1}$, $L_{b2}$ and $L_{b3}$ of three grain boundaries B present on the figure are measured, and the total $L_b$ of those is then obtained (Formula (1)).

$$L_b = L_{b1} + L_{b2} + L_{b3} \quad (1)$$

In FIG. 3A, the respective lengths $L_{p1}$, $L_{p2}$, $L_{p3}$, $L_{p4}$ and $L_{p5}$ in a lengthwise direction of five intermetallic compounds C present on the grain boundary B are measured, and the total $L_p$ of those is then obtained (Formula (2)).

$$L_p = L_{p1} + L_{p2} + L_{p3} + L_{p4} + L_{p5} \quad (2)$$

The occupancy A of the intermetallic compounds C in FIG. 3A is calculated as a ratio (%) obtained by dividing $L_p$ by $L_b$ (Formula (3)).

$$A = L_p/L_b \times 100(\%) \quad (3)$$

Similarly, as illustrated in FIG. 3C, the respective lengths $L_{b1}$, $L_{b2}$ and $L_{b3}$ of three grain boundaries B present on the figure are measured, and the total $L_b$ of those is then obtained (Formula (4)).

$$L_b = L_{b1} + L_{b2} + L_{b3} \quad (4)$$

In FIG. 3B, the respective lengths $L_{p10}$, $L_{p11}$, $L_{p12}$, $L_{p13}$, $L_{p14}$, $L_{p15}$ and $L_{p16}$ in a lengthwise direction of seven intermetallic compounds C present on the grain boundaries B are measured, and the total $L_p'$ of those is then obtained (Formula (5)).

$$L_p' = L_{p10} + L_{p11} + L_{p12} + L_{p13} + L_{p14} + L_{p15} + L_{p16} \quad (5)$$

The occupancy A' of the intermetallic compounds C in FIG. 3B is calculated as a ratio (%) obtained by dividing $L_p'$ by $L_b$ (Formula (6)).

$$A' = L_p'/L_b \times 100(\%) \quad (6)$$

The occupancy of the intermetallic compounds thus calculated was 18% in the case of FIG. 2A, and was 45% in the case of FIG. 2B.

(Brazing Filler Material)

An Al—Si alloy is used as the brazing filler material. Particularly, an Al—Si alloy containing Si in an amount of from 4.0 to 12.0 mass % is desirable. Where the content of Si is less than 4.0 mass %, a liquid phase rate is decreased, and brazing is likely to be insufficient. On the other hand, where the content exceeds 12.0 mass %, coarse primary crystal Si is likely to be formed, and cracks are likely to occur during forming process.

To make the brazing filler material less noble and give a sacrificial anode effect to the brazing filler material, Zn may be added in an amount of from 1.0 to 7.0 mass % to an Al—Si alloy containing Si in an amount of from 4.0 to 12.0 mass %. In this case, where the amount of Zn is less than 1.0 mass %, the degree of less noble potential is small, and sacrificial protection effect is likely to be insufficient. Where the amount of Zn exceeds 7.0 mass %, Zn is likely to concentrate in a brazing filler reservoir (fillet) part formed in a joint portion with other member after brazing heating, and a fillet part is likely to be preferentially corroded.

It is preferred in the brazing sheet according to the present invention that the brazing filler material is clad in a thickness of 15 μm or more and in a clad ratio of from 1 to 25% per one surface. Where the thickness of the brazing filler material is less than 15 μm, the absolute amount of the brazing filler is insufficient, and there is concern that brazability is deteriorated. On the other hand, where the thickness of the brazing filler material becomes thick exceeding the clad ratio of 25%, the flowing quantity of the brazing filler becomes excess, a part thereof corrodes the core material, and there is concern that erosion of the core material occurs. In the case of an aluminum alloy brazing sheet having a brazing filler material provided on both surfaces thereof, the brazing filler material on the respective surfaces may be an aluminum alloy having the same component, and may be one having different component.

(Sacrificial Anode Material)

In the brazing sheet according to the present invention, by providing the brazing filler material on one surface of the core material and cladding a sacrificial anode material on the other surface opposite to the brazing filler material, corrosion resistance may be improved from the side of this surface. In preparing a brazed joint structure by using the brazing sheet provided with such a sacrificial anode material, a component is formed such that the surface provided with the sacrificial anode material faces a corrosion environment side.

As the sacrificial anode material, for example, an Al—Zn alloy containing Zn in an amount of from 1.0 to 6.0 mass % may be used. Zn has the effect to make potential of the sacrificial anode material less noble, and give a sacrificial anode effect. Where the amount of Zn is less than 1.0 mass %, the sacrificial protection effect is likely to be insufficient. Where the amount exceeds 6.0 mass %, there is concern that a potential difference between the sacrificial anode material and the core material becomes large, a consumption rate of the sacrificial anode material is increased and as a result, sufficient corrosion resistance cannot be secured.

As the sacrificial anode material, an Al—Si—Zn alloy containing Si in an amount of from 0.1 to 1.0 mass % and Zn in an amount of from 1.0 to 6.0 mass % may be used. Si acts to increase tensile strength of the sacrificial anode material. Where the content of Si is less than 0.1 mass %, there is concern that the improvement effect of tensile strength becomes insufficient. Where the content exceeds 1.0 mass %, there is concern that a solidus temperature of the sacrificial anode material is decreased and the sacrificial anode material melts during brazing heating. Where the content of Zn is less than 1.0 mass %, there is concern that the sacrificial protection effect becomes insufficient. Where the content exceeds 6.0 mass %, there is concern that a potential difference between the sacrificial anode material and the core material becomes large, a consumption rate of the sacrificial anode material is increased, and as a result, sufficient corrosion resistance cannot be secured.

As the sacrificial anode material, an Al—Mg—Si—Zn alloy containing Mg in an amount of from 0.1 to 4.0 mass %, Si in an amount of from 0.1 to 1.0 mass % and Zn in an amount of from 1.0 to 6.0 mass % may be used.

Mg forms $Mg_2Si$, in the case where it is present together with Si, and has the effect of thereby improving tensile strength after brazing. Where the content of Mg is less than 0.1 mass %, there is concern that the improvement effect of tensile strength becomes insufficient Where the content exceeds 4.0 mass %, there is concern that a solidus temperature of the sacrificial anode material is decreased and the sacrificial anode material melts during brazing heating. Where the content of Si is less than 0.1 mass %, there is concern that the improvement effect of tensile strength becomes insufficient Where the content exceeds 1.0 mass %, there is concern that a solidus temperature of the sacrificial anode material is decreased and the sacrificial anode material melts during brazing heating. Where the content of Zn is less than 1.0 mass %, there is concern that the sacrificial protection effect becomes insufficient Where the content exceeds 6.0 mass %, there is concern that a potential difference between the sacrificial anode material and the core material becomes large, a consumption rate of the sacrificial anode material is increased, and as a result, sufficient corrosion resistance cannot be secured.

The sacrificial anode material is not limited to those, and an Al—Si—Mn—Zn alloy, an Al—Mg—Zn alloy and the like may be used.

The present invention is a one relates to grain boundary corrosion susceptibility, and is not influenced by alloy species of the sacrificial anode material.

(Manufacturing Method)

The aluminum alloy brazing sheet according to the present invention can be manufactured by the manufacturing method described below.

An aluminum alloy that is a component for a core material of the aluminum alloy brazing sheet according to the present invention is melted and cast through a DC casting process, and as necessary, is subjected to facing and a homogenization heat treatment to obtain an ingot for the core material. Similarly, an ingot for the brazing filler material, and as necessary, an ingot for the sacrificial anode material, are obtained by the same method as in the ingot for the core material.

The respective ingots are hot-rolled or/and cut as necessary to obtain aluminum alloy sheets having a thickness of a ratio corresponding to a clad ratio in the aluminum alloy brazing sheet.

The respective aluminum alloy sheets are layered with the lamination order of the desired aluminum alloy brazing sheets, are heated at a temperature of 400° C. or higher (pre-heating for hot rolling), and then compressed and bonded through hot rolling (clad rolling) to obtain an integral sheet material. A coiling temperature after completion of the hot rolling is higher than 250° C. Thereafter, cold rolling, process annealing and final cold rolling are performed to give a desired sheet thickness. The process annealing may not be carried out and, after the final cold rolling for giving a final sheet thickness, the final annealing may be carried out.

(Brazed Joint Structure)

The brazed joint structure of the present invention is described in detail below.

Figure 1:
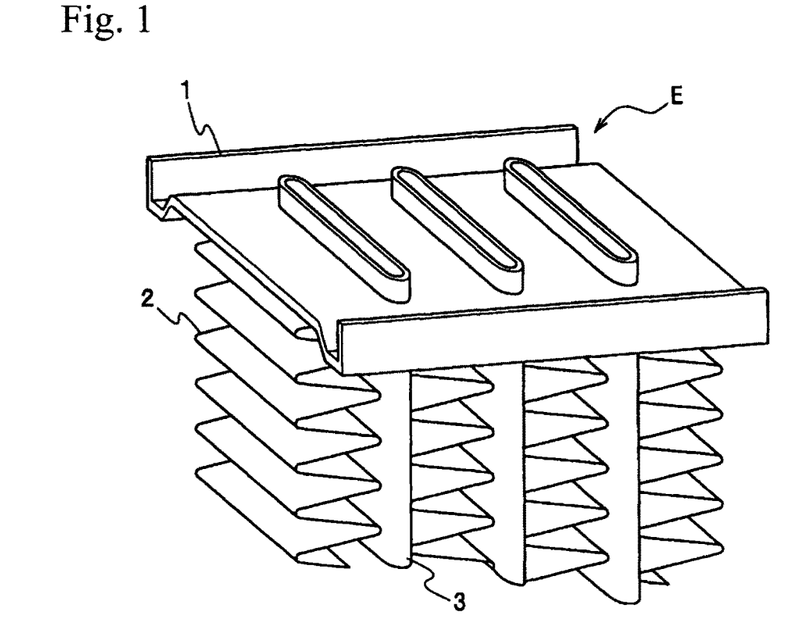
FIG. 1 is an enlarged perspective view of a main part of a heat exchanger by the brazed joint structure of the present invention.

FIG. 1 is an enlarged perspective view of a main part of an automotive heat exchanger that is the representative use of the brazed joint structure of the present invention. Heat exchanger E such as a condenser, an evaporator or an intercooler mounted on automobiles generally has a fabricated structure in which a flat tube 3 constituting a fluid passage and a fin 2 obtained by corrugating a sheet material are repeatedly and alternatively piled and combined, and the tube is fitted to a plate (header) 1 obtained by press forming a sheet material so as to gather fluid passages. By brazing heating in the state that those components are fabricated, the tube 3 and the fin 2, and the tube 3 and the plate 1 are joined, respectively, and a heat exchanger is manufactured. A brazing filler material melted by brazing heating is filled in a joint site between the components to form a brazing filler reservoir (fillet), and thereby the components are joined to each other. The brazing sheet including a core material containing an aluminum alloy, and a brazing filler material containing an Al—Si alloy, clad to at least one surface of the core material, according to the present invention can be applied to at least one of those tube 3, plate 1 and fin 2.

Examples

The present invention is described in more detail below based on the examples.

<Preparation of Sample>

A core material having the composition shown in Table 1 and a brazing filler material of an Al—Si alloy having the content of Si of 10 mass %, and a sacrificial anode material of an Al—Zn alloy having the content of Zn of 4 mass % were ingot-cast through DC casting, and both surfaces of each of them were faced to the desired thickness. The cell shown by "-" in Table 1 means that the element is not added.

The brazing filler material and sacrificial anode material were each subjected to a homogenization treatment, combined in the order of brazing filler material/core material/sacrificial anode material, heated, and then subjected to hot rolling up to a thickness of 3.0 mm. After the hot rolling, it was wound on a coil at a prescribed temperature. The coiling temperature after hot rolling was measured by contacting a contact thermometer with the edge face of the coil just after winding.

After the hot rolling, it was subjected to cold rolling up to a thickness of 0.5 mm, subjected to process annealing at 400° C. for 3 hours, and then subjected to cold rolling to obtain a brazing sheet having a thickness of 0.25 mm. Clad ratio of the brazing filler material and sacrificial anode material was 15%.

The sheet material prepared above was used as a sample, and the sample was heat-treated under the conditions of 600° C. for 3 minutes, cooled in a prescribed cooling rate, and brazed to obtain a brazing sheet. Regarding the brazing sheet obtained, the occupancy of intermetallic compounds, the grain size of a core material after brazing heating, corrosion resistance, tensile strength after brazing heating, brazability, and formability were evaluated by the following methods, and those results are shown in Table 2 and Table 3.

<Measurement of Grain Size of Core Material after Brazing Heating>

The grain size of the core material after brazing heating was measured as follows. The sample was heat-treated under the conditions of 600° C. for 3 minutes, and cooled in a cooling rate shown in Table 2 and Table 3. It was then polished from one surface thereof to a central part of a sheet thickness of the core material, and the surface polished was subjected to etching with an electrolyte, and photographed with an optical microscope in a magnification of 100. The grain size of the core material in a rolling direction was measured in the microphotograph by a section method. The grain size was measured at five places, and the average value was used for the evaluation. Regarding the grain size of the core material after brazing heating, 100 μm or more was indicated as "⊙", less than 100 μm and 50 μm or more was indicated as "○", and less than 50 μm was indicated as "X".

<Occupancy of Mg—Si and Al—Mg—Si—Cu Intermetallic Compounds Present in Grain Boundary>

The sample was heat-treated under the conditions of 600° C. for 3 minutes and cooled in a cooling rate shown in Table 2 and Table 3. Sheet surfaces were then polished up to a central part of a core material from both surfaces in a thickness direction and examined by the observation with a transmission electron microscope (TEM). The thickness of the observation portion was measured from thickness fringes, and the place observed was set to be only a place having a thickness of from 0.1 to 0.3 μm. The vicinity of grain boundary of each sample was observed in every 10 visual fields in a magnification of 10,000, TEM photographs in the respective visual fields were subjected to image analysis, and the occupancy of the intermetallic compounds was obtained from an average value of occupancies of the intermetallic compounds obtained from 10 visual fields. Occupancy A (%) of the intermetallic compounds was calculated from $A=L_p/L_b$. Here, $L_p$ is a value obtained by adding up all of the each measured lengths in a lengthwise direction of an Mg—Si intermetallic compound and an Al—Mg—Si—Cu intermetallic compound that are present in a grain boundary. $L_b$ is a value obtained by adding up all of the each measured lengths of grain boundaries. The sample in which the core material melts during brazing was not evaluated.

<Corrosion Resistance Evaluation>

Regarding the corrosion resistance, the sample was heat-treated under the conditions of 600° C. for 3 minutes and cooled in a cooling rate shown in Table 2 and Table 3, and then SWAAT (Synthetic sea Water Acetic Acid salt spray Test) defined in ASTM-G85-A3 was carried out such that a brazing filler material side is a test surface. Test conditions are as follows. Corrosion test liquid (liquid temperature 49° C.) obtained by adding acetic acid to synthetic sea water by ASTM D1141 and adjusted to pH 3 was used, and the corrosion test liquid was sprayed for 30 minutes to the sample, and the sample was placed in wet state (49° C., 98% RH) for 90 minutes. This was regarded as 120 minutes of 1 cycle, and 84 cycles (7 days) were carried out. Region where corrosion is most remarkable was subjected to cross-sectional observation by optical microscope, and corrosion state and corrosion depth were obtained. The case where the corrosion depth is less than 150 μm was indicated as very good (⊙), the case where the corrosion depth is 150 μm or more and less than 200 μm was indicated as good (○), and the case where the corrosion depth is 200 μm or more was indicated as poor (X). The sample in which the core material melts during brazing was not evaluated.

<Evaluation of Tensile Strength after Brazing>

Tensile strength after brazing was evaluated as follows. The sample was heat-treated under the conditions of 600° C. for 3 minutes and cooled in a cooling rate shown in Table 2 and Table 3. It was then maintained at room temperature for 7 days, and processed into JIS No. 5 test piece such that a tensile direction is parallel to a rolling direction, and a tensile test was carried out at room temperature to measure tensile strength after brazing. Regarding the tensile strength after brazing, one having tensile strength of 160 MPa or more was indicated as good (○), and one having tensile strength of less than 160 MPa was indicated as poor (X). The sample in which the core material melts during brazing was not evaluated.

<Evaluation of Brazability>

Brazability was evaluated by the evaluation method described in Tadashi Takemoto, et al., "Aluminum Brazing Handbook (revised edition)", The Japan Light Metal Welding and Construction Association (published in March, 2003), pages 132-136. A stainless steel spacer having a diameter of 2 mm was sandwiched between a lower sheet (3003 Al alloy sheet (thickness 1.0 mm×vertical width 25 mm×horizontal width 60 mm)) placed horizontally and an upper sheet (sample (thickness 0.3 mm×vertical width 25 mm×horizontal width 55 mm)) arranged vertically to the lower sheet, and a constant clearance was set. 5 g/m² of flux (FL-7 manufactured by Morita Chemical Industries Co., Ltd.) was applied to a brazing filler material surface side in the sample of the upper sheet. After conducting the heat treatment under the conditions of 600° C. for 3 minutes in nitrogen atmosphere, a length of a space filled up between the lower sheet and the upper sheet (filled up gap length) was measured with a vernier micrometer to convert brazability into numerals. One having a filled up gap length of 15 mm or more was indicated as good (○), and one having a filled up gap length of less than 15 mm was indicated as poor (X). The sample in which the core material melts during brazing was not evaluated.

<Evaluation of Formability>

Formability was evaluated by, before subjecting the sample to brazing heating, conducting Erichsen test according to JIS Z 2247 so as to project to a brazing filling material surface side, and measuring a projection height.

Regarding the formability, the case where the projection height is 8 mm or more was indicated as good (○), and the case where the projection height is less than 8 mm was indicated as poor (X). The sample in which the core material melts during brazing was not evaluated.

TABLE 1

| Core material No. | Compositional component of core material (mass %) Remainder: Al and unavoidable impurities | | | | | | Remarks |
|---|---|---|---|---|---|---|---|
| | Si | Mn | Cu | Mg | Ti | Fe | |
| 1 | 0.45 | 1.60 | 0.50 | 0.25 | 0.15 | 0.01 | Invention material |
| 2 | 0.35 | 1.40 | 0.65 | 0.35 | 0.20 | 0.05 | |
| 3 | 0.90 | 1.65 | 0.70 | 0.25 | 0.15 | 0.10 | |
| 4 | 0.55 | 0.90 | 0.55 | 0.30 | 0.25 | 0.07 | |
| 5 | 0.55 | 1.80 | 0.60 | 0.20 | 0.15 | 0.14 | |
| 6 | 0.70 | 1.55 | 0.40 | 0.25 | 0.20 | 0.13 | |
| 7 | 0.75 | 1.30 | 0.85 | 0.35 | 0.25 | 0.09 | |
| 8 | 0.60 | 1.25 | 0.55 | 0.16 | 0.15 | 0.02 | |
| 9 | 0.50 | 1.70 | 0.65 | 0.45 | 0.10 | 0.03 | |
| 10 | 0.75 | 1.20 | 0.70 | 0.40 | — | 0.10 | |
| 11 | 0.70 | 1.10 | 0.80 | 0.20 | 0.15 | 0.20 | |
| 12 | 0.25 | 1.60 | 0.70 | 0.20 | 0.15 | 0.14 | Comparative material |
| 13 | 1.05 | 1.55 | 0.55 | 0.30 | 0.20 | 0.11 | |
| 14 | 0.55 | 0.55 | 0.50 | 0.25 | 0.25 | 0.12 | |
| 15 | 0.80 | 2.10 | 0.60 | 0.35 | 0.15 | 0.04 | |
| 16 | 0.60 | 1.55 | 0.25 | 0.30 | 0.20 | 0.05 | |
| 17 | 0.45 | 1.50 | 1.05 | 0.20 | 0.10 | 0.06 | |
| 18 | 0.60 | 1.45 | 0.50 | 0.10 | 0.25 | 0.08 | |
| 19 | 0.80 | 1.70 | 0.65 | 0.55 | 0.15 | 0.09 | |
| 20 | 0.40 | 1.00 | 0.60 | 0.30 | 0.33 | 0.10 | |

*Fe is unavoidable impurities

TABLE 2

| | | Manufacturing condition | | Measurement value | | Evaluation | | | |
|---|---|---|---|---|---|---|---|---|---|
| | | Coiling | Cooling rate | Grain size of | Occupancy of Mg—Si | | | | |
| Ex. No. | Core material No. | temperature after hot rolling [° C.] | after brazing heating [° C./min] | core material after brazing heating | and Al—Mg—Si—Cu intermetallic compounds [%] | Corrosion resistance | Strength after brazing | Brazability | Formability |
| Ex. 1 | 1 | 270 | 230 | ⊙ | 19 | ⊙ | ○ | ○ | ○ |
| Ex. 2 | 2 | 255 | 135 | ⊙ | 38 | ○ | ○ | ○ | ○ |
| Ex. 3 | 3 | 300 | 200 | ⊙ | 30 | ○ | ○ | ○ | ○ |
| Ex. 4 | 4 | 310 | 350 | ⊙ | 20 | ⊙ | ○ | ○ | ○ |

TABLE 2-continued

| | | Manufacturing condition | | Measurement value | | Evaluation | | | |
|---|---|---|---|---|---|---|---|---|---|
| Ex. No. | Core material No. | Coiling temperature after hot rolling [° C.] | Cooling rate after brazing heating [° C./min] | Grain size of core material after brazing heating | Occupancy of Mg—Si and Al—Mg—Si—Cu intermetallic compounds [%] | Corrosion resistance | Strength after brazing | Brazability | Formability |
| Ex. 5 | 5 | 330 | 280 | ⊙ | 13 | ⊙ | ○ | ○ | ○ |
| Ex. 6 | 6 | 350 | 150 | ⊙ | 35 | ○ | ○ | ○ | ○ |
| Ex. 7 | 7 | 255 | 1000 | ⊙ | 8 | ⊙ | ○ | ○ | ○ |
| Ex. 8 | 8 | 260 | 300 | ⊙ | 15 | ⊙ | ○ | ○ | ○ |
| Ex. 9 | 9 | 300 | 500 | ⊙ | 10 | ⊙ | ○ | ○ | ○ |
| Ex. 10 | 1 | 330 | 30000 | ⊙ | 5 | ⊙ | ○ | ○ | ○ |
| Ex. 11 | 10 | 300 | 300 | ⊙ | 23 | ○ | ○ | ○ | ○ |
| Ex. 12 | 11 | 330 | 300 | ○ | 20 | ○ | ○ | ○ | ○ |

TABLE 3

| | | Manufacturing condition | | Measurement value | | Evaluation | | | |
|---|---|---|---|---|---|---|---|---|---|
| Comp. Ex. No. | Core material No. | Coiling temperature after hot rolling [° C.] | Cooling rate after brazing heating [° C./min] | Grain size of core material after brazing heating | Occupancy of Mg—Si and Al—Mg—Si—Cu intermetallic compounds [%] | Corrosion resistance | Strength after brazing | Brazability | Formability |
| Comp. Ex. 1 | <u>12</u> | 300 | 300 | ⊙ | 14 | ⊙ | X | ○ | ○ |
| Comp. Ex. 2 | <u>13</u> | 330 | 300 | ⊙ | Melted | Melted | Melted | Melted | Melted |
| Comp. Ex. 3 | <u>14</u> | 270 | 300 | ⊙ | 18 | ⊙ | X | ○ | ○ |
| Comp. Ex. 4 | <u>15</u> | 350 | 300 | ⊙ | 22 | ⊙ | ○ | ○ | X |
| Comp. Ex. 5 | <u>16</u> | 330 | 300 | ⊙ | 20 | ⊙ | X | ○ | ○ |
| Comp. Ex. 6 | <u>17</u> | 300 | 300 | ⊙ | Melted | Melted | Melted | Melted | Melted |
| Comp. Ex. 7 | <u>18</u> | 260 | 300 | ⊙ | 12 | ⊙ | X | ○ | ○ |
| Comp. Ex. 8 | <u>19</u> | 255 | 300 | ⊙ | 35 | ⊙ | ○ | X | ○ |
| Comp. Ex. 9 | <u>20</u> | 270 | 300 | ⊙ | 20 | ⊙ | ○ | ○ | X |
| Comp. Ex. 10 | 1 | 300 | 100 | ⊙ | <u>50</u> | X | ○ | ○ | ○ |
| Comp. Ex. 11 | 1 | 350 | 10 | ⊙ | <u>55</u> | X | ○ | ○ | ○ |
| Comp. Ex. 12 | 1 | 230 | 210 | <u>X</u> | 23 | X | ○ | ○ | ○ |

As shown in Table 1 and Table 2, the brazed samples (Examples 1 to 12) manufactured by using core materials (core material Nos. 1 to 11) containing aluminum alloys satisfying the requirements recited in the claims of the present invention, having a grain size of the core material of 50 μm or more, and having the occupancy of the Mg—Si intermetallic compound and Al—Mg—Si—Cu intermetallic compound of 40% or less were excellent in tensile strength after brazing, corrosion resistance, brazability and formability.

On the other hand, the brazed samples (Comparative Examples 1 to 9) manufactured by using core materials (core material Nos. 12 to 20) containing aluminum alloys not satisfying the requirements recited in the claims of the present invention were poor in any one or more of tensile strength after brazing, corrosion resistance, brazability and formability. In Comparative Example 2 and Comparative Example 6, the core material melted, and it was impossible to evaluate various performances as a brazing sheet. Furthermore, the samples (Comparative Examples 10 to 11) that are produced by using the core material (core material No. 1) containing an aluminum alloy satisfying the requirements recited in the claims of the present invention, but the cooling rate after brazing and heating is less than 130° C./min and the occupancy of the Mg—Si intermetallic compound and Al—Mg—Si—Cu intermetallic compound exceeds 40%, were poor in corrosion resistance. Furthermore, the sample (Comparative Example 12) that is produced by using the core material (core material No. 1) containing an aluminum alloy satisfying the requirements recited in the claims of the present invention, but the coiling temperature after hot rolling is 250° C. or lower and the grain size of the core material after brazing heating is less than 50 μm was poor in corrosion resistance.

In Table 1 to Table 3, the numerical values that do not satisfy the requirements of the present invention are shown by underlining the numerical values.

While the present invention has been explained in detail with reference to specific embodiments, it is apparent to one skilled in the art that various changes and modifications can be made therein without departing from the spirit and scope of the present invention.

This application is based on Japanese Patent Application (No. 2013-075264) filed on Mar. 29, 2013, the contents of which are incorporated here by reference.

INDUSTRIAL APPLICABILITY

The brazed joint structure of the present invention is suitable for automotive heat exchangers and the like, and improves tensile strength after brazing, and corrosion resistance while maintaining brazability and formability.

| | Reference Signs List |
|---|---|
| E | Heat exchanger |
| 1 | Plate |
| 2 | Fin |
| 3 | Tube |
| B | Grain boundary |
| C | Intermetallic compound |

The invention claimed is:

1. A brazed joint structure, comprising
a brazing sheet which has been brazed and which comprises
a core material comprising an aluminum alloy, and
a brazing filler material comprising an Al—Si alloy and being clad to at least one surface of the core material,
wherein
the brazing filler material is clad in a thickness of 15 μm or more and in a clad ratio of from 1 to 25% per surface,
the aluminum alloy of the core material comprises
Si in an amount of more than 0.3 mass % and 1.0 mass % or less,
Mn in an amount of 0.7 mass % or more and 2.0 mass % or less,
Cu in an amount of more than 0.3 mass % and 1.0 mass % or less,
Mg in an amount of more than 0.15 mass % and 0.5 mass % or less, and
Al,
wherein the core material has an average grain size of 50 μm or more, and
wherein an occupancy of an Mg—Si intermetallic compound and an Al—Mg—Si—Cu intermetallic compound that are present in a grain boundary of the core material is 23% or less.

2. The brazed joint structure according to claim 1, wherein the aluminum alloy of the core material further comprises
Fe in an amount of less than 0.15 mass %.

3. The brazed joint structure according to claim 1, wherein the aluminum alloy of the core material further comprises
Ti in an amount of more than 0.05 mass % and 0.25 mass % or less.

4. The brazed joint structure according to claim 1, further comprising
a sacrificial anode material which is clad to the other surface of the core material.

5. The brazed joint structure according to claim 2, further comprising
a sacrificial anode material which is clad to the other surface of the core material.

6. The brazed joint structure according to claim 3, further comprising
a sacrificial anode material which is clad to the other surface of the core material.

7. The brazed joint structure according to claim 2, wherein the aluminum alloy of the core material further comprises
Ti in an amount of more than 0.05 mass % and 0.25 mass % or less.

8. The brazed joint structure according to claim 7, further comprising
a sacrificial anode material which is clad to the other surface of the core material.

9. The brazed joint structure according to claim 1, wherein the Al—Si alloy of the brazing filler material comprises
Si in an amount of from 4.0 mass % to 12.0 mass %.

10. The brazed joint structure according to claim 1, wherein the Al—Si alloy of the brazing filler material further comprises
Zn in an amount of from 1.0 mass % to 7.0 mass %.

11. The brazed joint structure according to claim 4, wherein the sacrificial anode material comprises an Al—Zn alloy.

* * * * *